May 16, 1967 — A. B. LEWIS — 3,319,367
SCOOP ATTACHMENT FOR TRACTOR THREE POINT HITCH
Filed Sept. 22, 1964 — 2 Sheets-Sheet 1
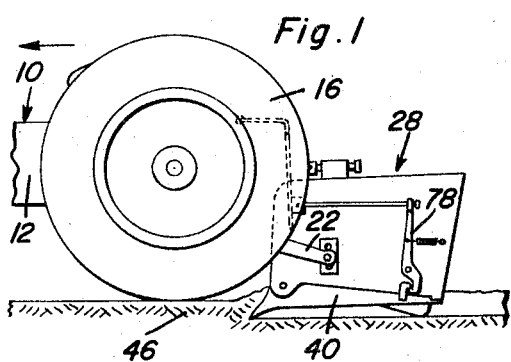
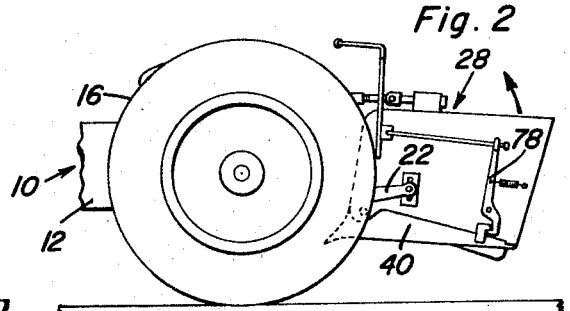
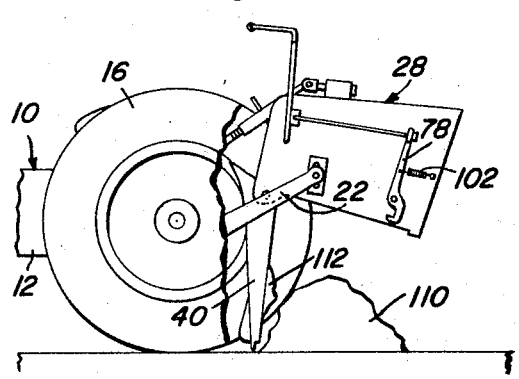
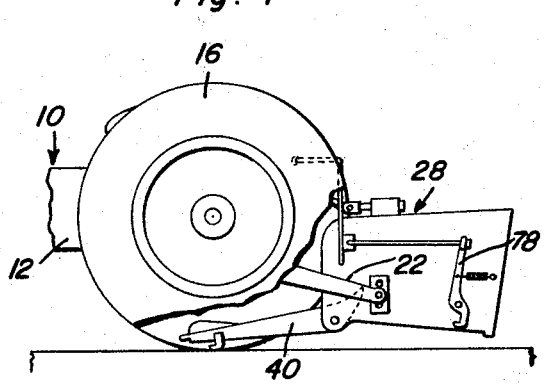
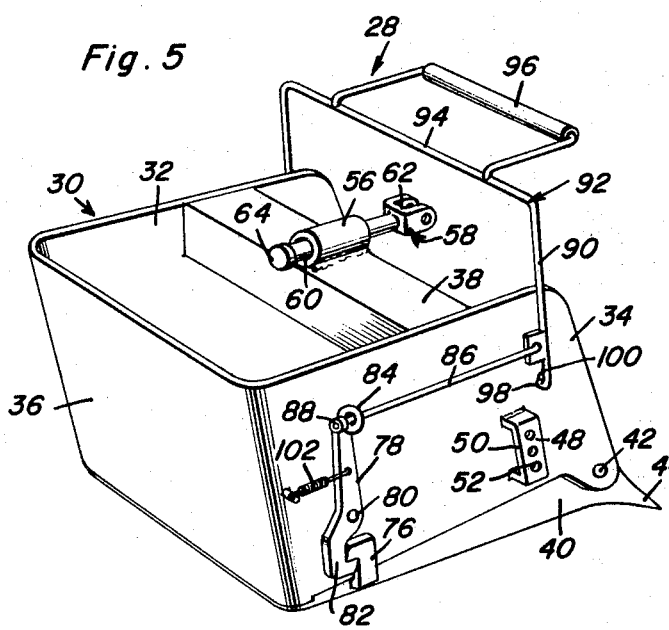
Albert B. Lewis
INVENTOR.

May 16, 1967 A. B. LEWIS 3,319,367
SCOOP ATTACHMENT FOR TRACTOR THREE POINT HITCH
Filed Sept. 22, 1964 2 Sheets-Sheet 2
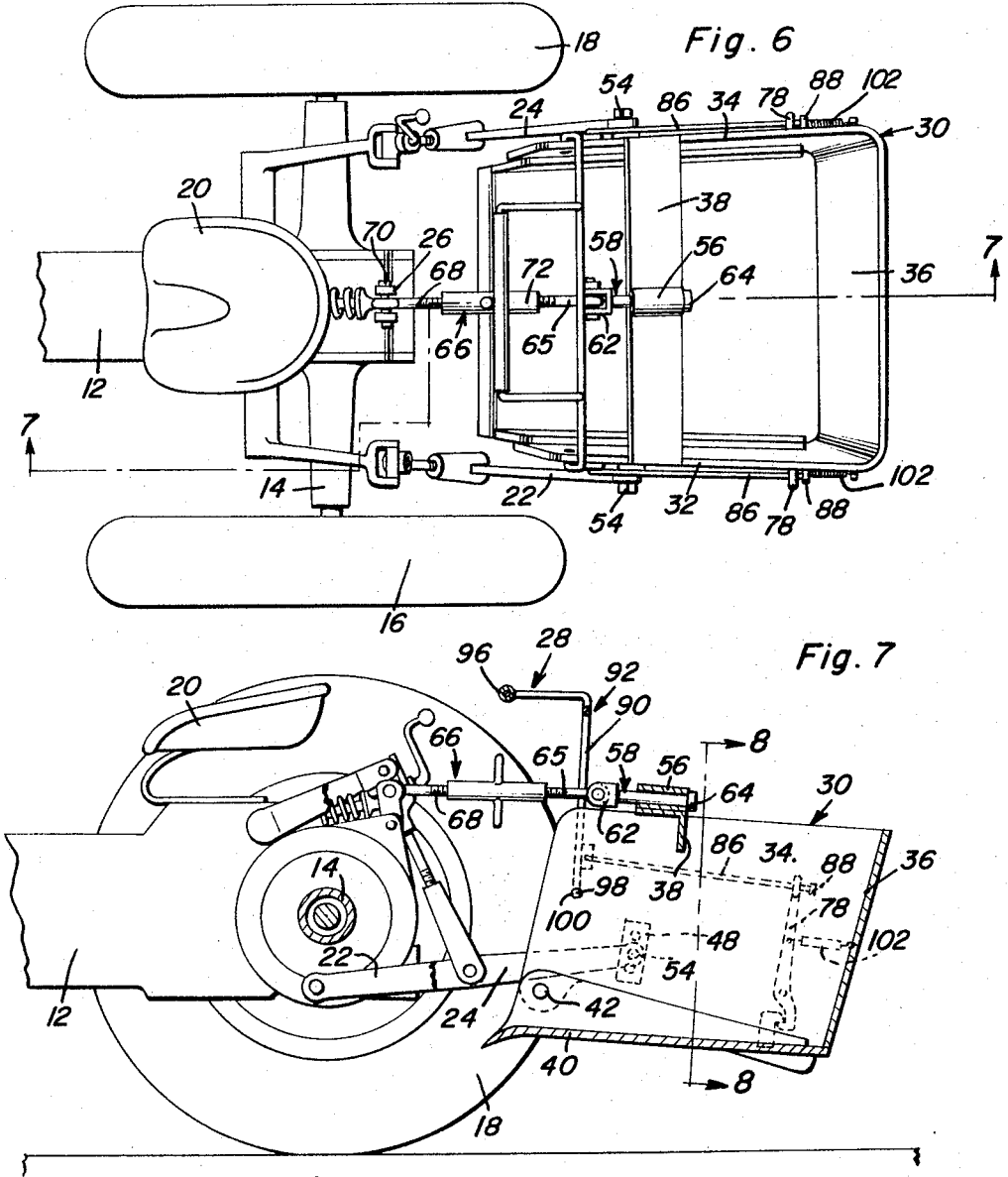
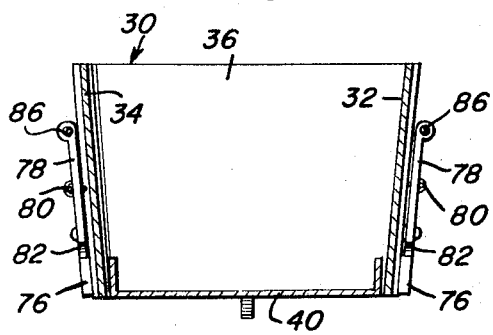
Albert B. Lewis
INVENTOR.

3,319,367
SCOOP ATTACHMENT FOR TRACTOR THREE POINT HITCH
Albert B. Lewis, Rte. 5, McAlester, Okla. 74501
Filed Sept. 22, 1964, Ser. No. 398,262
1 Claim. (Cl. 37—118)

This invention relates to a novel and useful scoop attachment for a tractor having a three point lifting hitch assembly and more specifically to a scoop attachment of the drag-bucket type and including improved structural features.

The drag bucket scoop attachment of the instant invention is constructed so as to be wider at the top than it is at the bottom. In addition, the drag bucket is wider at the rear than it is at its open front end and the bucket is further provided with a hinged bottom which is capable of swinging 180° from its closed position.

In addition to the above improved features, the drag bucket of the attachment includes means at its upper end in the form of a connecting member which is mounted on the bucket for reciprocal horizontal movement longitudinally of the bucket. The connecting member is pivotally secured to the upper center arm of the three point hitch of the tractor and the lost motion connection between the connecting member and the bucket enables the bucket to be slightly pivoted from a substantially horizontally disposed position to a downwardly and rearwardly inclined position.

The main object of this invention is to provide an improved scoop attachment for a tractor including a drag bucket constructed in a manner such that moist clay will be prevented from becoming wedged in the front part of the scoop as the scoop is moved along the ground.

A further object of this invention is to provide a drag bucket constructed in a manner such that the dirt forced into the bucket will not be compacted to such a great extent that the dirt will not drop freely from the bucket when the bottom thereof is pivoted to the open position.

A further object of this invention is to provide a drag bucket attachment which will be freely pivotable from a substantially horizontally disposed position to a rearwardly and downwardly inclined position about an axis extending transversely of the lower portion of the open forward end of the bucket.

A final object of this invention to be specifically enumerated herein is to provide a scoop attachment in accordance with the preceding objects which will conform to conventional forms of manufacture, be of simple construction and easy to use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a tractor shown with the scoop attachment of the instant invention operatively supported from the three point lifting hitch assembly of the tractor and the scoop attachment being utilized to scoop dirt from the ground;

FIGURE 2 is a fragmentary side elevational view similar to that of FIGURE 1 but showing the drag bucket portion of the scoop attachment being lifted toward an elevated position after being at least partially filled with dirt;

FIGURE 3 is a fragmentary elevational view similar to FIGURES 1 and 2 but showing the drag bucket in the dump position with the bottom thereof swung to a substantially perpendicularly disposed position;

FIGURE 4 is a fragmentary side elevational view similar to FIGURES 1–3 but shown with the opened drag bucket disposed in closely spaced relation above the ground from which the tractor is supported and the bottom of the bucket swung substantially 180° from its closed position whereby rearward movement of the tractor will cause the ground to clean the surface of the bottom which is disposed uppermost when the bottom is in its closed position;

FIGURE 5 is a perspective view of the scoop attachment;

FIGURE 6 is an enlarged top plan view of the assemblage illustrated in FIGURE 2;

FIGURE 7 is a longitudinal vertical sectional view taken substantially upon the plane indicated by the section line 7—7 of FIGURE 6; and FIGURE 8 is a transverse vertical sectional view taken substantially upon the plane indicated by the section line 8—8 of FIGURE 7.

Referring now more specifically to the drawings, the numeral 10 generally designates a tractor including a main frame 12 from which a rear axle assembly 14 is supported, the rear axle assembly 14 journaling a pair of ground-engaging wheels 16 and 18. In addition, the tractor frame 12 also supports an operator's seat 20 and a three point lift assembly including a pair of opposite side lower lift arms 22 and 24 and an upper center lift arm 26.

The scoop attachment of the instant invention is generally referred to by the reference numeral 28 and includes a drag bucket generally referred to by the reference numeral 30 having upstanding opposite side walls 32 and 34 interconnected at their rear ends by means of an end wall 36. A transverse brace member 38 extends and is secured between the upper marginal portions of the forward ends of the side walls 32 and 34 and a bottom 40 is swingably supported from the front lower corner portions of the side walls 32 and 34 by means of a pair of pivot fasteners 42. The forward end edge portion of the bottom 40 is curved downwardly as at 44 to form a digging lip which will assist the drag bucket in digging into the ground 46 as illustrated in FIGURE 1 of the drawings.

A pair of generally U-shaped mounting brackets 48 are secured to the outer surfaces of the forward portions of the side walls 32 and 34 and include upstanding bight portions 50 having a plurality of vertically spaced apertures 52 formed therethrough. The rear ends of the opposite side lift arms 22 and 24 are pivotally secured to the drag bucket 30 by means of suitable pivot fasteners 54 secured through the rear ends of the lift arms 22 and 24 and a selected pair of corresponding sets of apertures 52.

The transverse brace member 38 includes a generally horizontally disposed and longitudinally extending sleeve 56 which projects above the upper surface of the brace member 38. A connecting member generally referred to by the reference numeral 58 and including a headed shank portion 60 is slidably received through the sleeve 56 and includes a bifurcated end portion 62 on the end of the shank portion 60 remote from the head 64 thereof. The bifurcated end portion 62 of the connecting member 58 is pivotally secured to the rear section 65 of a longitudinally extensible pull arm 66 whose forward end section 68 is pivotally secured to the upper end of the center lift arm 26 by means of a suitable pivot fastener 70. The opposite end sections 65 and 68 of the pull arm or member 66 are threadedly engaged in the internally threaded opposite end portions of the center section 72 of the pull arm 66 and accordingly, it may be seen that the effective length of the pull arm 66 may be adjusted as desired.

A pair of upstanding and rearwardly opening hooks 76 are secured to the opposite sides of the rear end portion of the bottom 40 and a pair of levers 78 are pivotally secured to the opposite side walls 32 and 34 by means of pivot fasteners 80. The lower ends of the levers 78 include forwardly opening hooks 82 with which the hooks 76 are engageable and the upper ends of the levers 78 include eye portions 84 through which the rear ends of a pair of pull rods 86 are slidably received. The rear ends of the pull rods 86 each includes a diametrically enlarged end portion 88 and the front ends of the pull rods 86 are pivotally secured to the lower end portions of the depending legs 90 of an inverted U-shaped actuating bail generally referred to by the reference numeral 92 and including a generally horizontally disposed bight portion 94 interconnecting the upper ends of the legs 90, the bight portion 94 also including a forwardly projecting handle 96 which is disposed closely adjacent the rear of the operator's seat 20. The lower ends of the depending legs 90 of the actuating bail 92 include laterally and inwardly directed end portions 98 which are rotatably received in apertures 100 provided therefor in the side walls 32 and 34.

A pair of expansion springs 102 are secured between the side walls 32 and 34 and the upper end portions of the levers 78 and yieldingly urge the levers 78 toward the latched positions illustrated in FIGURE 5 of the drawings. However, a forward pull on the handle 96 will cause the upper ends of the levers 78, by means of the pull rods 86 and the diametrically enlarged end portions 88, to swing the upper end portions of the levers 78 in a forward direction thus moving the hooked portions 82 out of registry with the hooks 76 and thus enabling the bottom 40 to swing from the closed position illustrated in FIGURE 5 of the drawings to the open position illustrated in FIGURE 3 of the drawings. In addition, from FIGURE 4 of the drawings, it may be seen that the bottom 40 may also be swung to a position rotated approximately 180° from the closed position of the bottom.

After the drag bucket 30 has been utilized to remove quantities of dirt from the ground 46 in the manner illustrated in FIGURE 1 of the drawings, the three point hitch assembly may be actuated to raise the drag bucket 30 as shown in FIGURE 2 of the drawings to the position illustrated in FIGURE 3 of the drawings whereupon the handle 96 may be pulled forward by the operator of the tractor 10 so as to free the bottom 40 in order that the latter may swing to the open position illustrated in FIGURE 3 of the drawings. Should any quantity of the load 110 of dirt dumped from the drag bucket 30 stick to the bottom 40 as at 112, see FIGURE 3, the operator of the tractor 10 may move the latter in a rearward direction while simultaneously lowering the drag bucket 30. This mode of operation will cause the bottom 40 to swing to a position rotated at substantially 180° from the normal closed position of the bottom and thus enable the ground 46 to scrub the normally upwardly facing surface of the bottom 40.

From a comparison of FIGURES 1 and 7 of the drawings it is believed readily apparent that the lost motion connection between the connecting member 58 and the drag bucket 30 will allow the drag bucket 30 to assume a substantially horizontally disposed position such as that illustrated in FIGURE 1 of the drawings when the drag bucket is being utilized to remove dirt from the ground 46 and a rearwardly and downwardly inclined transport position such as that illustrated in FIGURE 7 of the drawings. In this manner, the normal tendency of dirt to fall out of the drag bucket as the latter is being transported in the raised position illustrated in FIGURES 2 and 3 of the drawings will be minimized.

Further, the forward open mouth of the bucket 30 is narrower than the rear wall 36 thereof and from FIGURE 8 of the drawings it may be seen that the width of the lower portion of the bucket 30 is less than the width of the upper portion. This two-way tapering of the drag bucket 30 insures that moist clay will not be wedged in the front part of the scoop or drag bucket 30. In addition, the downward tapering of the drag bucket in transverse width will also insure that the dirt forced into the drag bucket 30 will not be compacted to the extent that it would remain within the drag bucket and between the side walls 32 and 34 thereof even though the bottom 40 had been swung to the open position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination with a tractor having a three point lifting hitch assembly including a rearwardly projecting center upper lift arm and a pair of opposite side and rearwardly projecting lower lift arms, a scoop attachment comprising a generally horizontally disposed drag bucket including longitudinally extending and upstanding opposite side walls interconnected at their rear ends by means of a rear wall, said drag bucket being open at its forward end and including an upper forward brace member extending between the forward upper corner portions of said side walls and also including a bottom whose forward end edge portion is pivotally secured between said side walls for rotation about an axis extending between the lower forward corner portions of said side walls, said bottom and at least one of said walls including coacting releasable latch means for retaining said bottom in a closed position, the rear end portions of said lower arms being pivotally secured to the forward lower corner portions of the corresponding side walls for rotation about axes generally paralleling the first mentioned axis and disposed forward of the center of gravity of said bucket, a connecting member mounted on said brace member for limited front to rear reciprocation relative to said bucket between front and rear positions, the rear end portion of said upper arm being pivotally secured to said connecting member for rotation about a transverse horizontal axis, said bottom of said bucket, when closed and when said connecting member is in said front and rear position being generally horizontally disposed and rearwardly and downwardly inclined, respectively, said coacting latch means including upstanding rearwardly opening first hook means carried by the opposite side portions of said bottom wall and upstanding latching levers pivotally secured, intermediate their upper and lower ends, to said side walls for rotation about a horizontal transverse axis and including second hook means releasably engaged with said first hook means, means connected between said levers and said bucket yieldingly urging rotation of said levers in directions moving the upper ends thereof rearwardly, movable latch actuator means supported from said bucket and including a lost motion connection with said levers and a portion disposed forward and above the open front end of said bucket for manual manipulation from said tractor to swing the upper ends of said levers forwardly.

References Cited by the Examiner

UNITED STATES PATENTS

| | | | |
|---|---|---|---|
| 293,261 | 2/1884 | Matchham | 37—118 X |
| 346,147 | 7/1886 | Deevy | 37—134 |
| 996,596 | 6/1911 | Lindner | 37—134 X |
| 2,273,875 | 2/1942 | Livesey et al. | 37—126 |
| 2,652,761 | 9/1953 | Gibson | 172—439 |
| 2,772,798 | 12/1956 | McClenny | 37—126 X |

ABRAHAM G. STONE, *Primary Examiner.*

A. E. KOPECKI, *Assistant Examiner.*